Oct. 2, 1956     B. W. CARTWRIGHT     2,764,902
HYDRODYNAMIC TRANSMISSION
Filed Sept. 5, 1952     3 Sheets-Sheet 1
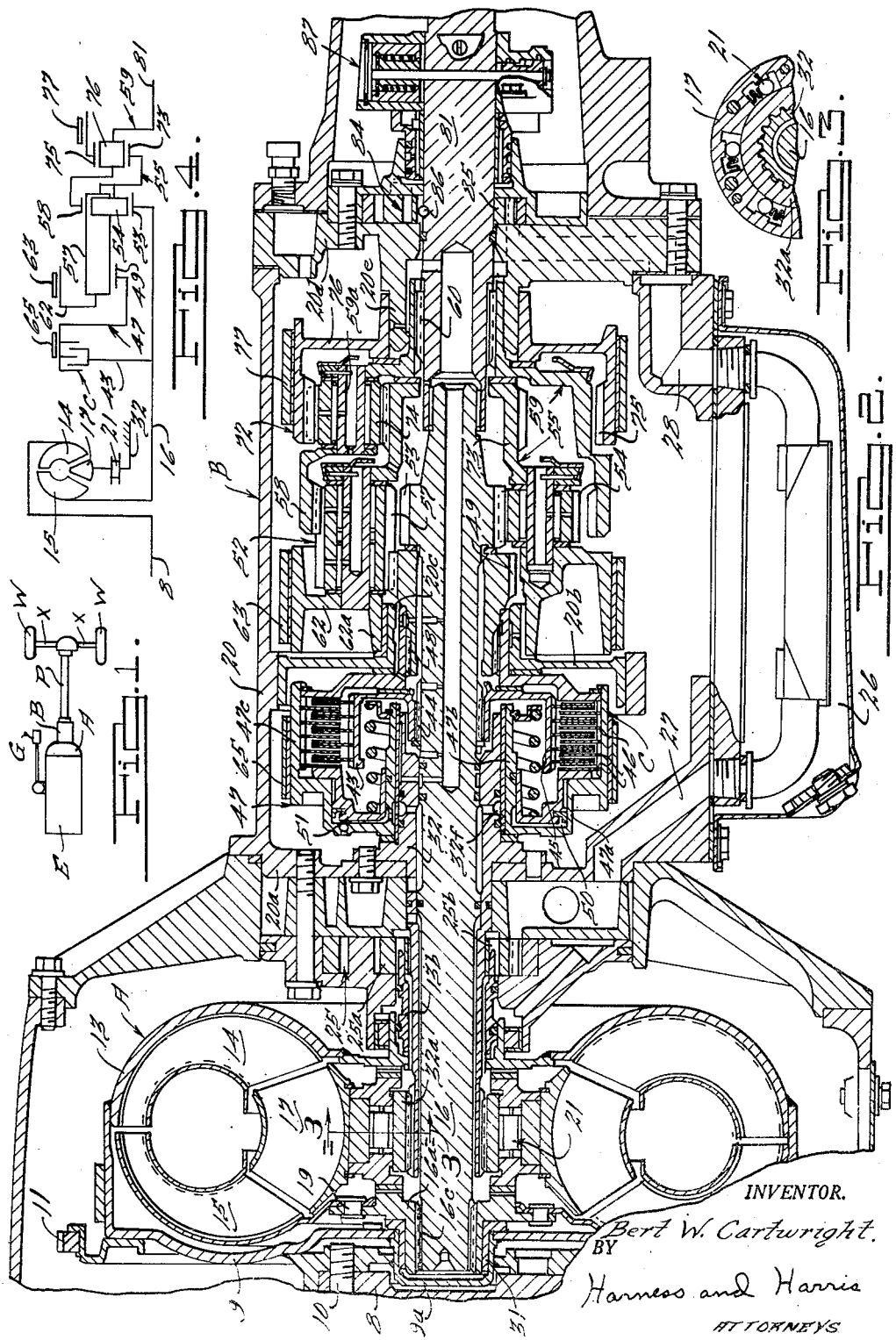
INVENTOR.
Bert W. Cartwright.
BY Harness and Harris
ATTORNEYS

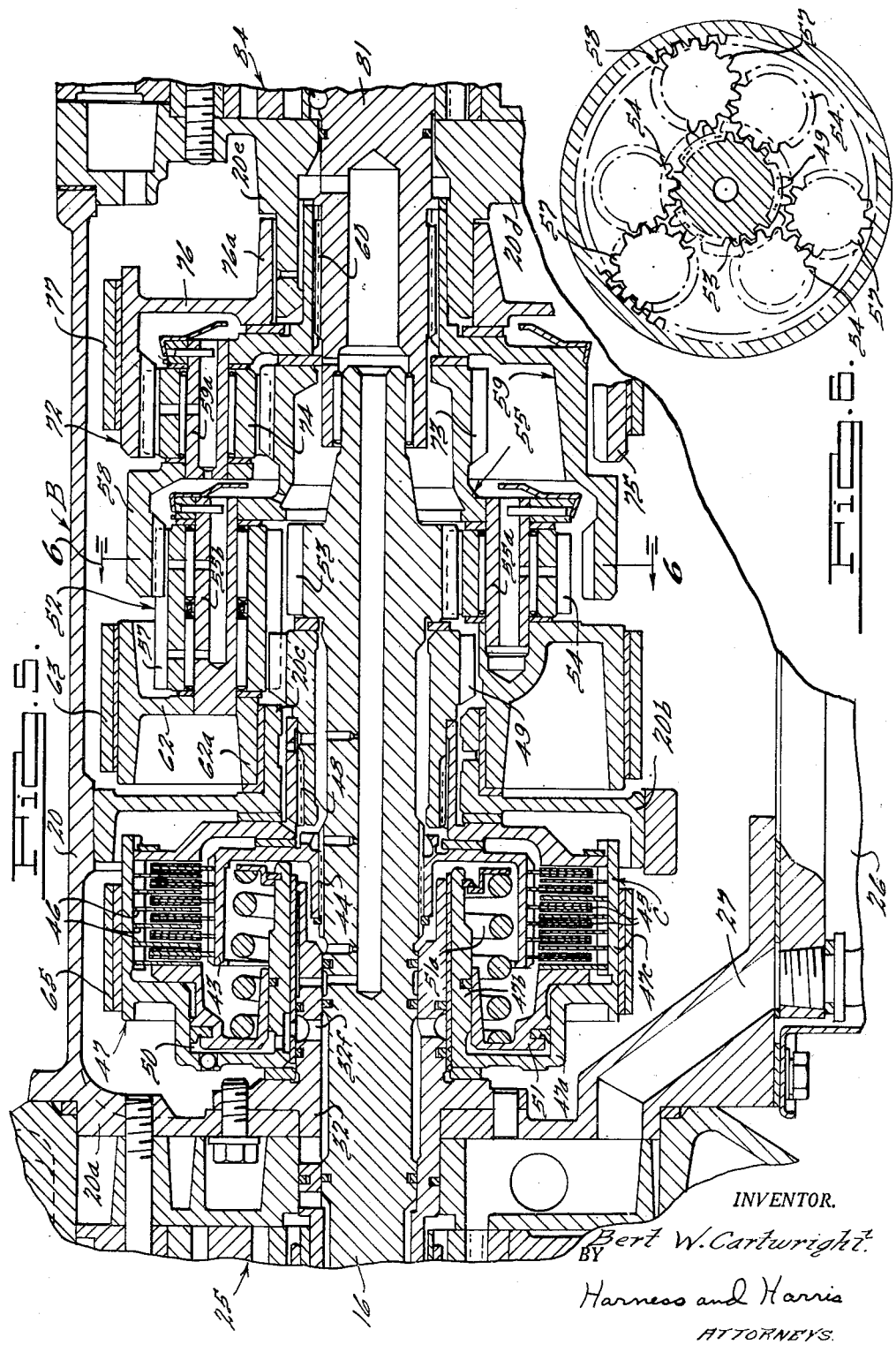

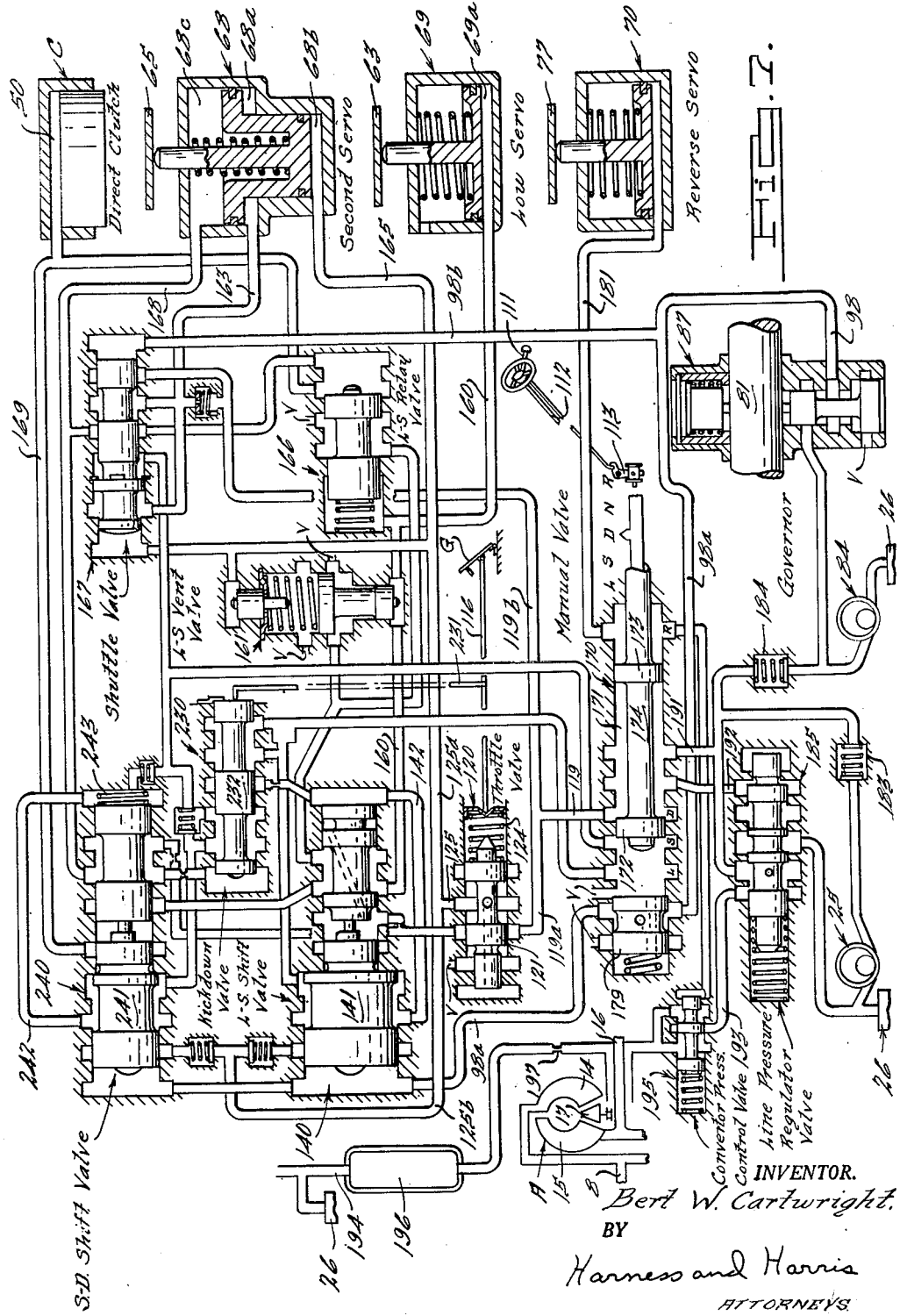

United States Patent Office 2,764,902
Patented Oct. 2, 1956

2,764,902

HYDRODYNAMIC TRANSMISSION

Bert W. Cartwright, Detroit, Mich., assignor to Chrysler Corporation, Highland Park, Mich., a corporation of Delaware Application September 5, 1952, Serial No. 308,123

18 Claims. (Cl. 74—732)

This invention relates to a power transmission unit that comprises a torque multiplying fluid power transmitting device and a planetary type change speed gear box arranged in series relationship for the transmission of drive. More particularly this invention pertains to the change speed gear box of this drive train and to the control means associated therewith.

It is a primary object of this invention to provide a planetary gear box of a simplified, improved, design that may be readily associated with a hydrodynamic torque converter so as to provide a fully automatic three speed power transmission unit wherein the loads and speeds applied to the several elements of the transmission unit are most favorable for long, economical transmission life and most conducive to smooth, fast upshifts and downshifts between the several speed ratio drives.

It is another object of this invention to provide a power transmission unit comprising a series arranged hydrodynamic torque converter and a two planetary gear set box wherein only a single clutch and three brakes are required to provide a three forward speed and reverse power transmission unit.

It is still another object of this invention to provide a three speed power transmission unit utilizing two planetary gear sets and only a single gear train lock-up clutch device wherein the clutch device is never required to take full engine torque.

It is still another object of this invention to provide a three speed power transmission unit utilizing a pair of planetary gear sets wherein the shift between a "kicked-down" underdrive and a direct drive involves alternate application of a direct drive clutch and a planetary brake band such that the "kicked-down" underdrive requires activation of only a single epicyclic gear train.

It is still another object of this invention to provide a three speed gear box comprising a pair of planetary gear trains including a single clutch element and a pair of band elements wherein all clutch and band reactions are taken on stationary casing support members.

It is still another object of this invention to provide a planetary gear box for a two planetary, compounded, gear set that provides the maximum in rigidity and compactness with the minimum in structural complexity.

It is still another object of this invention to provide a two planetary three speed gear box that provides the most desirable gear ratios with the lowest gear speeds and gear loads.

It is a further object of this invention to provide a two planetary, three speed gear box that has only a single clutch and a pair of brake bands whereby the transmission control system may be of a simplified form.

Other objects and advantages of this invention will become apparent from a reading of the description below and a consideration of the related drawings wherein:

Fig. 1 is a diagrammatic plan view of the power transmission unit embodying this invention applied to a motor vehicle drive train;

Fig. 2 is a sectional elevational view of a power transmission unit embodying this invention, the power transmission unit including a hydrokinetic torque converter and a planetary type change speed transmission gear box arranged in series relationship;

Fig. 3 is a fragmentary sectional elevational view of portions of the hydrokinetic torque converter, the view being taken along the line 3—3 of Fig. 2;

Fig. 4 is a schematic diagram of this power transmission unit;

Fig. 5 is an enlarged sectional elevational view of the change speed gear box associated with this power transmission unit;

Fig. 6 is a sectional elevational view of the compounded pinion gearing associated with the forward drive planetary gear train, the view being taken along the line 6—6 of Fig. 5; and Fig. 7 is a diagrammatic view of a hydraulic control system for the disclosed power transmission unit.

Fig. 1 diagrammatically discloses a conventional motor vehicle power plant and drive train comprising an internal combustion engine E drivingly connected to a hydrokinetic type of torque converter unit A of the power transmission unit that also includes a change speed gear box B. The output from gear box B drives a propeller or drive shaft P that transmits drive to the rear wheels W of the vehicle through the rear driving axles X. Engine E includes the usual carburetor accelerator pedal G.

Fig. 2 of the drawings discloses the power transmission unit per se that comprises a hydrokinetic torque converter unit A and a planetary type change speed gear box B arranged in series drive transmitting relationship. Converter unit A is adapted to drivingly connect a prime mover such as the motor vehicle engine E to the input shaft of transmission gear box B. The reference numeral 8 represents an end portion of an engine driven member, such as the engine crankshaft of the motor vehicle power unit E. The crankshaft 8 is drivingly connected to the drive transmitting casing portion 9 by the screw means 10. The drive transmitting casing portion 9 has an engine starter ring gear 11 mounted on its periphery. Also drivingly connected to the casing portion 9 is the complementary torque converter casing portion 13. Within casing portions 9, 13 are mounted the various converter components, namely, the impeller member 14, the turbine or runner member 15, and the guide wheel or reaction member 17.

The vaned impeller wheel 14 is fixedly connected to the converter casing 13 and is accordingly adapted to be rotatably driven by the engine driven shaft 8. The vaned turbine wheel 15 is drivingly connected by rivet means 19 to a radially extending flange portion formed on the hub member 16a of the converter driven shaft 16. Hub member 16a is connected by splines 16c or the like to the forward end portion of the converter driven intermediate shaft member 16.

The converter driven intermediate shaft member 16 is adapted to transmit drive from the torque converter unit A to the gear box B arranged rearwardly of and in series with the torque converter unit A. The forward end of intermediate shaft 16 is piloted in a bearing assembly 31 that is mounted in an axially extending seat 9a formed in the front end of the converter casing portion 9. The rear end portion of intermediate shaft 16 is piloted in the forward end of the output shaft 81.

The vaned guide wheel 17 of the converter is rotatably supported within the converter casing 13 by means of the one-way brake device 21 (see Fig. 3). The one-way brake device 21 is mounted on the forward end of the axially extending sleeve 32 that is fixed to and projects from the rearwardly positioned, relatively stationary, gear box casing wall 20a. Sleeve 32 has a hub member 32a splined thereto which hub member supports the overrunning or one-way brake device 21. The one-way brake 21 is designed and arranged such that it will permit only forward rotary movement (clockwise when looking from the converter A towards gear box B of Fig. 1) to be transmitted to guide wheel 17 by the forward or clockwise rotation of the impeller 14. The brake 21 locks against the sleeve hub 32a to prevent rotation of the guide wheel 17 in a reverse or counterclockwise direction.

The torque converter unit A includes a gear type oil pump 25 having a driven gear 25a that is directly connected by splineway means 25b to the axially extending, sleeve-like flange portion 13b of the rotatable converter casing 13. The pump 25 draws oil from a sump 26 through the conduit 27 and circulates it through the converter unit A, portions of the transmission lubricating system, and the various hydraulically operated control mechanisms associated with this transmission unit. The circulation of oil through the converter A, by the pump 25, provides a means for maintaining the converter full of oil whenever the engine crankshaft 8 is rotating. A second oil pump 84 driven by the transmission output shaft 81 is also included in this power transmission unit to provide a source of pressure fluid when the engine E is not operating. Pump 84 is connected to oil supply sump 26 by conduit 28 and discharges oil to the same elements as pump 25. The pump 84 and its operation will be hereinafter more fully described.

The gear box B includes a friction disc direct drive clutch C that comprises the drum-like annular member 43 which is splined at 44 to the intermediate driven shaft 16. Driven shaft 16 constitutes the input member of clutch C. Mounted on the peripheral portion of the annular member 43 are friction disc clutch elements 45. Clutch elements 45 are adapted to be engaged with cooperating clutch elements 46 carried by the encircling drum-shaped member 47. Drum-shaped member 47 is drivingly connected at 48 to the sun gear 49 of the change speed gear box B. Drum member 47 has wall portions 47a and 47b that journal the member 47 on the casing mounted bearing sleeve 32. The walls of drum member 47 are also formed to provide a piston receiving bore 50. Engagement of clutch discs 45 and 46 is effected by the admission of pressure fluid to the cylinder bore 50 in the drum member 47. Pressure fluid admitted to cylinder bore 50 moves the reciprocably mounted piston 51 rearwardly to cause engagement of clutch discs 45 and 46. Compression spring 51a normally urges piston 51 towards a forward, disengaged clutch position. Passage 32f in sleeve 32 provides a means for supplying pressure fluid to the cylinder bore 50.

The planetary gearing that is disposed between the clutch C and the output shaft 81 comprises a first set of compounded gearing 52 to provide for the several forward drive ratios and a second set of gearing 72 to provide for reverse drive. Forward drive gearing 52 includes the sun gear 53 which is an integral part of the intermediate drive shaft 16. Sun gear 53 meshingly engages with the short pinion gear members 54 of the compounded or double pinion gears 54, 57 that are rotatably mounted on the carrier element 55. Carrier 55 is provided with a sun gear portion 73 that forms part of the reverse drive planetary gear set 72. Carrier element 55 mounts pinion gear axles 55a for journaling the short pinion gears 54 and it also mounts pinion gear axles 55b for journaling the long pinion gears 57. The relatively long pinion gears 57 are meshingly engaged with the relatively short pinion gears 54 and with the clutch drum mounted gear element 49. The long pinion gears 57 also have portions thereof surrounded by and meshingly engaged with the annulus gear 58.

Annulus gear 58 is part of a drive transmitting member 59 that is drivingly connected to the output shaft 81 by the splined connection 60. Drive transmitting member 59 includes in addition to the annulus gear portion 58 the pinion gear axles 59a that journal the pinion gears 74 of the reverse gear set. Pinion gears 74 will be further described in the following description of reverse drive gear set 72.

The carrier member 55 of gear set 52 has a brake drum portion 62 drivingly connected to the pinion gear supporting axles 55b. A brake band 63 encircles the peripheral flange on brake drum 62 and is adapted to be applied thereto to anchor carrier 55 against rotation and thereby activate gear set 52 for the transmission of the Low speed forward drive ratio. It will be noted that brake drum 62 has the hub portion 62a thereof journaled on the axially extending neck portion 20c of the casing partition wall 20b. By this arrangement the brake reaction resulting from the application of brake band 63 to drum 62 is applied to the casing 20 rather than to the shaft 16 and its supporting bearings.

It will be noted that the outer periphery 47c of the drum member 47 of direct drive clutch C is encircled by a brake band 65. Application of brake band 65 to drum 47 anchors the drum 47 and the attached sun gear 49 against rotation and conditions the forward drive gear set 52 for the transmission of the Second or Kicked Down speed ratio drive. As was the case when brake band 63 was applied, application of band 65 to drum 47 applies the brake reaction to the case 20 rather than to shaft 16 due to the fact that drum portion 47b is journaled on the casing supported sleeve 32.

From a consideration of Figs. 5 and 6, it is thought to be clear that input to gear train 52 is from the input or sun gear 53 to the small pinion gears 54. Small pinion gears 54 are meshed with and drive the long pinions 57. Long pinions 57 are meshed with and drive annulus gear 58 whenever the reaction brake bands 63 or 65 are applied to elements 62 or 47 of the gear train 52 so as to give either Low or Second speed drive repectively. When clutch C is engaged then input gear 53 and reaction gear 49 of gear train 52 are both drivingly connected to the drive shaft 16 so the gear train 52 is then locked up for the transmission of direct drive.

Arranged rearwardly of the forward drive planetary gearing 52 is a second set of planetary gearing that is designated generally by the numeral 72. The gear set 72 provides for reverse drive and comprises the sun gear element 73 that is an integral part of the carrier member 55 of forward drive gear set 52. Sun gear 73 meshingly engages with pinion gears 74 that are rotatably mounted on the axles 59a of the pinion gear carrier 59. As previously mentioned carrier 59 is drivingly connected to the output shaft 81 and also forms an integral part of the annulus gear 58 of gear set 52 so it will thus be seen that the carrier member 59 provides the output or drive transmitting member for each of the sets of planetary gearing 52, 72. An annulus gear 75 is formed as part of a drum member 76 that has its hub portion 76a journaled on the casing neck portion 20e. Annulus gear 75 is arranged in meshing engagement with pinion gears 74 of the gear set 72. The outer peripheral flange of the drum member 76 is encircled by a brake band 77 that is adapted to be applied to the outer flange of drum member 76 to anchor same against rotation and condition gear set 72 for the transmission of a Reverse drive between shafts 16 and 81. Here also brake reaction is taken by casing 20 when gear set 72 is activated.

On the rear side of the casing wall 20d is mounted the second oil pump 84. Oil pump 84 is similar to oil pump 25 and includes a driving gear element 85 that is drivingly connected by pin means 86 to the transmission output shaft 81. Oil is withdrawn by pump 84 from the transmission case oil sump 26 through the conduit 28. Pressurized oil is distributed by the pump 84 to the supply for the converter A and to the hydraulic control system for the transmission as well as to the pressurized transmission lubrication system.

A hydraulic control system for the herein described transmission unit is shown diagrammatically in Fig. 7 and is similar to the type disclosed in the copending application of William L. Sheppard, Serial No. 254,531, filed November 2, 1951. The vehicle speed responsive governor mechanism 87, shown mounted on the ouput shaft 81 of the herein described transmission, is identical to that described and claimed in William L. Sheppard copending application Serial No. 98,493, filed June 11, 1949, now Patent No. 2,697,363. In addition to the vehicle speed responsive control 87, some form of torque regulating or torque responsive control such as a valve operated by the engine accelerator pedal G is included in this transmission control system so as to provide both speed and torque responsive control mechanisms to control operation of the transmission.

It is proposed to have suitable hydraulic controls for this transmission so as to provide a fully automatic three speed gear box in addition to providing means for locking the transmission in either of the two underdrive ratios and reverse drive.

The control system (see Fig. 7) for this transmission includes the manually operable drive ratio selector lever 111 which is rotatably mounted on the conventional motor vehicle steering column 112. Control lever 111 is connected by suitable linkage 113 to the manually operable drive ratio selector valve 170. Valve 170 has five drive ratio positions which are represented in the drawings by the letters R, N, D, S, and L respectively. These letters correspond to the Reverse, Neutral, Drive, Second and Low ratios which ratios are selectively obtainable by manual shift of selector lever 111. The letter V associated with the valve units 120, 170 and with the other valve units of this control system, denotes a vent or drain port for returning the control system pressure fluid to the supply sump 26.

Pressure fluid from either of the supply pumps 25 or 84 is directed into the main supply conduit 191 which is connected to the manually operable drive ratio selector valve 170. The pressure of the fluid in supply conduit 191 is controlled by the pressure regulator valve 185 and this controlled pump supplied pressure is denoted "line" pressure (90 p. s. i.) for purposes of description hereafter. Check valves 183 and 184 maintain a closed pressure fluid supply system. On admission of "line" pressure fluid to the bore 171 of drive ratio selector valve 170 certain of the control mechanisms associated with the control system will be energized and one or the other of the several aforementioned drive ratios will be established. When the manual valve 170 is located in the Neutral position the valve lands 172 and 173 of plunger valve element 174 close off the escape of pressurized line fluid from valve bore 171 and thus line pressure fluid cannot pass from supply conduit 191 through valve 170 to activate any of the drive ratio control mechanisms. However, it should be noted that when the manually controlled valve 170 is placed in the Neutral position with the vehicle engine running, or when the vehicle is being pushed or towed so that one or the other of pumps 25 or 84 is operating, line pressure fluid from one or the other of pumps, 25, 84 can still be directed through conduit 192 to the line pressure regulator valve 185 and through valve 185 to the conduit 193 that supplies pressure fluid to the converter A. Conduit 193 may contain a converter fluid pressure regulator valve 195 to control the pressure of the fluid directed into the converter A. Pressure fluid passing through converter A is passed on to the pressurized transmission lubrication system and to the sump 26 by the conduit 194. Conduit 194 has associated therewith a flow restriction 197 and a converter fluid cooling unit 196. The converter pressure regulator valve 195 preferably maintains a pressure of approximately 55 to 60 p. s. i. in the converter at all times except in reverse.

In either of the forward drive ratio positions D or S or L of the drive ratio selector valve element 174, "line" pressure fluid from supply conduit 191 will always be directed through the bore 171 of valve unit 170 and into the connected conduits 119, 119a that connect the manual drive ratio selector valve unit 170 with the torque controlled or torque responsive throttle valve unit 120. Consequently a form of torque responsive control is always available to cooperate with the driven shaft speed responsive governor 87 to conjointly control automatic operation of this transmission unit in all forward drive ratios. "Line" pressure passed to conduit 119 whenever the ratio selector valve 170 is in either Drive, Second or Low ratio also fills conduit 119a and is passed around throttle valve 120 through shift valve 140 and into conduit 160 for transfer to the apply side chamber 69a of the Low servo 69 of drive train 52. Thus planetary 52 is initially activated for the Low underdrive whenever valve unit 170 is set for Drive or Second or Low and all starts will be through the Low underdrive initially.

The torque responsive throttle valve unit 120 has operably associated therewith through linkage 231 a kickdown valve-controlled mechanism 230 that is hereinafter described. The torque responsive throttle valve 120 is operated by linkage 116 connected to the throttle control or accelerator pedal G for the engine unit E that drives this power transmission unit. The piston type throttle valve element 121 of valve unit 120 is arranged to be reciprocated by oscillation of the linkage 116. Throttle valve unit plunger element 121 is arranged to reciprocate in the bore of the valve unit 120 and it is connected to the actuating linkage 116 through a compression spring 124. At closed or idle throttle position of the accelerator pedal G with the manual control valve 170 set for either of the forward drive ratios D, S or L, the arrangement of the plunger valve 121 in the bore of valve 120 is such as to permit pressurized fluid to flow from the supply conduit 119a through valve 120 to conduit 125 and branch conduits 125a and 125b. The pressure of the fluid passing out of valve 120 may be lower than that of the line pressure supplied thereto due to the reducing valve action of valve 120. This reduced or compensated line pressure supplied to conduits 125, 125a and 125b, is denoted "throttle" pressure hereinafter.

Admission of "throttle" pressure to the branch conduit 125b at low vehicle speeds permits this throttle responsive pressurized fluid to be passed from conduit 125b through the left end bore chambers of valves 140, 240 and through the conduits 142, 242 and be applied to the right ends of the plunger valves 141 and 241 of control valves 140 and 240 respectively. When the vehicle is at a stop or traveling at relatively low speeds then the valves 141 and 241 will be positioned at the left ends of their valve bores and conduit 125b is connected to conduits 142 and 242 through the left end portions of the valves 140, 240. Drive ratio shift control valves 140 and 240 are differential pressure operated shift valves that automatically effect the speed ratio shifts between Low and Second and Second and Direct respectively. The details and the manner of operation of differential pressure operated control valves such as these are quite clearly described in the copending application of William L. Sheppard, Serial No. 98,493, filed June 11, 1949, now Patent No. 2,697,363. "Governor" pressure fluid from the governor output conduit 98 is passed into branch conduit 98a which applies the output shaft speed responsive pressurized fluid to the left end of valves 141 and 241. This "governor" pressure in the valve bores at the left end of valve units 140, 240 tends to urge the plunger type valve elements 141, 241 towards the right ends of the valve units 140, 240. Thus is will be seen that the pressure differential between the throttle responsive pressure fluid, which can be passed from conduit 125b through bypasses 142, 242 and applied to the right ends of valves 141, 241 at low vehicle speeds, and the output shaft speed responsive pressurized fluid, which fluids are applied to the left ends of valves 141, 241, effects reciprocating movement of the interrelated shift valves 141, 241 within their valve bores. At relatively low output shaft speeds the "throttle" pressure is greater than the "governor" pressure and the valves 141, 241 are automatically positioned at the left ends of their valve bores. As the output shaft speed increases points are reached where the "governor" pressure exerts a force on the left end of the valves 141, 241 that overcomes the force of the "throttle" pressure on right ends of the valves and then valves 141, 241 successively shift towards the right to positions such as those actually shown in Fig. 7 which correspond to Direct drive. This differential pressure generated shift of the valves 141, 241 is utilized to automatically control operation of the direct drive clutch C and the servos 68 and 69 for the forward drive braking bands 63, 65. It should be pointed out that the diameter of valve 141 is greater than the diameter of valve 241 and thus the same pressurized fluids admitted to the valve units 140, 240 will produce different shift forces and as a result different points are obtainable for the shifts from Low to Second and Second to Direct. Also valve 241 must work against a spring 243 so this tends to raise its upshift point above that of the Low to Second shift valve 141. Upshift of valve 141 may occur from about 9 to 18 M. P. H. while upshift of valve 241 may occur from about 18–68 M. P. H. It is thought to be obvious that the points of shift of valves 141, 241 will vary considerably depending on the degree of throttle valve opening as compared to the output shaft speed at any given time.

After initiating drive in "Low" the rightward shift of shift valve 141 will vent the band applying "line" pressure from "Low" servo 69 through the vent valve 161. At the same time upshift of valve 141 will vent the existing "line" pressure from the band off or release chamber 68c of the "Second" speed control servo 68 by way of conduit 163. While operating in "Low" line pressure was supplied to the band apply chamber 68a of the Second servo 68. The venting of chamber 68c permits Second band 65 to be applied as the Low band 63 is released. Thus as "Low" control band 63 is released "Second" control band 65 is applied to effect the upshift to "Second" speed. In addition to using "line" pressure to apply "Second" band 65, "throttle" pressure is also applied to chamber 68b of servo 68 by way of conduit 165 to assist the "line" pressure in chamber 68a in holding band 65 applied. Relay valve 166 and shuttle valve 167 also participate in controlling the pressure fluids applied to the several servos but it is not thought that a description of their functions is necessary for an understanding of the invention claimed herein.

After the upshift from "Low" to "Second" then subsequently the shift valve 240 will effect an automatic upshift from "Second" to "Direct." To accomplish this shift "line" pressure is directed into release chamber 68c of servo 68 by way of conduit 168 so as to effect release of "Second" band 65. At the same time "line" pressure is directed by way of conduit 169 into the bore 50 of "Direct" clutch C to cause engagement of clutch C and lock up of planetary 52 so as to provide for the transmission of a direct drive from shaft 16 to output shaft 81. Automatic downshifts from Direct to Second to Low are effected in the reverse manner to that described for the upshifts.

In addition to the automatic downshifts it is possible for the transmission operator to overrule the automatic controls and effect a downshift from "Direct" to "Second" at substantially any time he desires by merely fully depressing the accelerator pedal G. Such an accelerator depression will cause linkage 116 to apply linkage 231 to the right end of kickdown valve 230 and shift valve element 232 to the left. Leftward shift of valve 232 when the transmission is operating in "Direct" will bring about an immediate downshift from "Direct" to "Second" due to the application of a pressurized fluid to the right end of shift valve 241. When valve 241 is kicked down then "line" pressure is supplied to chamber 68a of servo 68 and venting of the bore 50 of clutch C occurs. After the kickdown to "Second" the transmission control system will either automatically upshift to "Direct" or release of the depressed accelerator G, or, if the output shaft speed should be dropping, then possibly the control system would automatically downshift to "Low" for a more favorable speed ratio drive in the starting underdrive ratio.

In addition to the operator effected, accelerator pedal actuated downshift, the transmission operator can also downshift from "Direct" to "Second" or "Low" by manually shifting drive control lever 111 to either the "Second" or "Low" position. This manual shift will lock the transmission in the particularly selected drive ratio and prevent automatic upshifts or downshifts therefrom. Locking of the transmission in either the "Second" or "Low" ratio is particularly advantageous for coast braking. It might be pointed out that the control system includes valve means 179 in the manual control valve unit 170 to limit the top speed at which the manual downshift to "Low" may be accomplished. If the manual shift to "Low" is attempted at too high a speed then the transmission will first downshift to "Second" and thereafter, when the speed has dropped sufficiently, will then downshift to "Low" and remain locked in the preselected "Low" ratio until the control lever 111 is shifted to some other ratio.

Reverse drive is accomplished by setting the drive control lever 111 in the Reserve position. This prevents "line" pressure from being applied to the conduit 192 of the line pressure regulator valve 185 and thus there is a reduced fluid pressure generated force applied to the right end of valve 185. Accordingly, it takes a greater "line" pressure to shift the line pressure regulator valve 185 leftward against its opposing spring. In this manner the line pressure regulator valve causes the control system to pass a boosted "line" pressure through conduit 181 to the Reverse servo 70 and apply band 77 to annulus gear 75 so as to condition planetary gear set 72 for transmission of a reverse drive to output shaft 81. A more complete description of the line pressure regulator valve appears in each of the aforementioned William L. Sheppard patent applications. As this line pressure control valve is not a part of this invention further description thereof is not included. The other portions of the control system are deactivated at the time Reverse is active so there is no automatic upshifting or downshifting involved. However, in addition to the torque effect of the gear set 72 there is also the torque multiplication of the converter A so a starting reverse drive raito of 19.8 to 1 is possible.

As the invention herein described and claimed does not relate to controls but the gear box per se, it is not thought that a more detailed description of the control system is required. Suffice it to say that with the torque converter A having a torque multiplying stall ratio of 2.5 and with a rear wheel driving axle ratio of 3.1, then the table set forth below gives the pertinent information relative to the driving ratios obtainable with a transmission of this type.

| Drive Ratio | Control Applied | 2.5 Torque Converter | 3.1 Axle Ratio |
| --- | --- | --- | --- |
| | | Gear Ratio | Overall Ratio |
| Low (1st) | Band 63 | 2.69 | 20.9–8.35 |
| Kickdown (2nd) | Band 65 | 1.53 | 4.74 |
| Direct (3rd) | Clutch C | 1.00 | 3.10 |
| Reverse | Band 77 | 2.55 | 19.8–7.91 |

From a consideration of the aforegoing description and the related drawings, it is thought to be clear that this transmission provides a compact, rigid, relatively simple gear box that can be combined with a hydrodynamic torque converter device to provide a fully automatic three speed gear box that will give the required ratios and flexibility in order to efficiently operate a present day motor vehicle in current traffic and on current highways. When forward drive is to be initiated, the controls are set in Drive and this will initially apply the Low band 63 to drum 62 and thereby activate gear set 52 for the "Low" ratio. By initially starting in "Low" or 1st speed, the gearing 52 is combined with the torque multiplication of converter A so as to give a starting drive overall ratio of as much as 20.9 to 1. The control system will thereafter, when speed and torque conditions are satisfactory, automatically release band 63 and apply band 65 to sun gear drum member 47 so as to upshift the drive ratio from the "Low" or 1st speed to the 2nd or "Kickdown" speed ratio drive. Thereafter, when speed and torque conditions are satisfactory, the control system will again automatically upshift the speed ratio drive from the "Second" ratio to the "Direct" speed ratio by releasing band 65 and engaging direct drive clutch C. A downshift may be manually accomplished from the "Direct" drive to both the "Second" and the "Low" ratios. The control system includes means to lock the controls in either of the "Low" or "Kickdown" ratios so that each of these ratios may be used for coast braking or the like.

It will be noted that the transmission disclosed utilizes only a single clutch C and three planetary brake bands 63, 65 and 77 to provide a three speed and reverse drive gear box. Furthermore, the most frequent shift, namely that between direct drive and "Kickdown" or "Second" speed, involves the alternate application and release of the clutch C and band 65. Such a shift is considered to be much preferred over a clutch to clutch shift due to the smaller quantities of pressure fluid that need to be transferred during the shift period. In addition it will be noted that during use of the "Kickdown" or "Second" ratio only the epicyclic gear train 52 is activated and it will be found that the loads on the elements of this gear set are relatively low.

Another advantageous feature of this transmission gear box is the design whereby each band and clutch reaction member is journaled on a stationary rigid casing element such that deflection loads will not be applied to the drive transmitting elements of the transmission unit.

I claim:

1. A power transmission unit comprising a hydrodynamic torque converter including impeller, turbine and reaction members, and a multi-speed planetary gear box including first and second planetary gear sets and an output shaft, said gear sets each being arranged in series between said converter and said output shaft, said gear box comprising an intermediate shaft connected to the converter turbine member and adapted to transmit drive between the turbine member and the several gear sets, said intermediate shaft drivingly mounting a first sun gear of said first gear set, a second sun gear for said first gear set rotatably mounted in said gear box, a clutch device connectible between said intermediate shaft and said second sun gear of said first gear set, a first brake means to selectively anchor said second sun gear of said first gear set against rotation, a first set of interengaged pinion gearing meshingly engaged with the first and second sun gears of said first gear set, a first pinion gear carrier rotatably supporting said first set of pinion gearing, said first carrier drivingly mounting a gear forming the sun gear element of said second gear set, a second brake means to selectively anchor said first carrier against rotation, a first annulus gear meshingly engaged with the first set of pinion gearing, said first annulus gear drivingly mounting a second pinion gear carrier that forms the pinion gear carrier of said second gear set, said second carrier being drivingly connected to said output shaft, a second set of pinion gearing rotatably supported on said second carrier and meshingly engaged with the sun gear of said second gear set, a second annulus gear rotatably mounted in said gear box and meshingly engaged with the second set of pinion gearing, and a third brake means to selectively anchor said second annulus gear against rotation.

2. A power transmission unit comprising a hydrodynamic torque converter including impeller, turbine and reaction members, and a multi-speed planetary gear box including a casing rotatably supporting first and second planetary gear sets and an output shaft, said gear sets each being arranged in series between said converter and said output shaft, said gear box comprising an intermediate shaft journaled in said casing and connected to the converter turbine member and adapted to transmit drive between the turbine member and the several gear sets, said intermediate shaft mounting a first sun gear of said first gear set, a second sun gear for said first gear set rotatably mounted in a wall of said casing, a clutch device journaled on a wall of said casing and connectible between said intermediate shaft and said second sun gear of said first gear set, a first brake means to selectively anchor said second sun gear of said first gear set against rotation, a first set of interengaged, compounded, pinion gearing meshingly engaged with the first and second sun gears of said first gear set, a first pinion gear carrier rotatably supporting said first set of pinion gearing, said first carrier drivingly mounting a gear forming the sun gear element of said second gear set, a second brake means to selectively anchor said first carrier against rotation, a first annulus gear meshingly engaged with the first set of pinion gearing, said first annulus gear drivingly mounting a second pinion gear carrier that forms the pinion gear carrier of said second gear set, said second carrier being drivingly connected to said output shaft, a second set of pinion gearing rotatably supported on said second carrier and meshingly engaged with the sun gear of said second gear set, a second annulus gear rotatably mounted in a wall of said casing and meshingly engaged with the second set of pinion gearing, and a third brake means to selectively anchor said second annulus gear against rotation.

3. A power transmission unit comprising a multi-speed planetary gear box including an input shaft, first and second planetary gear sets and an output shaft, said gear sets each being arranged in series between said input and said output shaft, said input shaft drivingly mounting a first sun gear of said first gear set, a second sun gear for said first gear set rotatably mounted in said gear box, a clutch device connectible between said input shaft and said second sun gear of said first gear set, a first brake means to selectively anchor said second sun gear of said first gear set against rotation, a first set of interengaged pinion gearing meshingly engaged with the first and second sun gears of said first gear set, a first pinion gear carrier rotatably supporting said first set of pinion gearing, said first carrier drivingly mounting a gear forming the sun gear element of said second gear set, a second brake means to selectively anchor said first carrier against rotation, a first annulus gear meshingly engaged with the first set of pinion gearing, said first annulus gear drivingly mounting a second pinion gear carrier that forms the pinion gear carrier of said second gear set, said second carrier being drivingly connected to said output shaft, a second set of pinion gearing rotatably supported on said second carrier and meshingly engaged with the sun gear of said second gear set, a second annulus gear rotatably mounted in said gear box and meshingly engaged with the second set of pinion gearing, and a third brake means to selectively anchor said second annulus gear against rotation.

4. A power transmission unit comprising a hydrodynamic torque converter including impeller, turbine and reaction members, and a multi-speed planetary gear box including first and second planetary gear sets and an output shaft, said gear sets each being arranged in series between said converter and said output shaft, said gear box comprising an intermediate shaft connected to the converter turbine member and adapted to transmit drive between the turbine member and the several gear sets, said intermediate shaft drivingly mounting a first input gear of said first gear set, a first reaction gear for said first gear set rotatably mounted in said gear box, a clutch device connectible between said intermediate shaft and said first reaction gear of said first gear set, a first brake means to selectively anchor said first reaction gear of said first gear set against rotation, a first set of interengaged compounded pinion gearing meshingly engaged with the first input and first reaction gears of said first gear set, a first pinion gear carrier rotatably supporting said first set of pinion gearing, said first carrier drivingly mounting a gear forming the input gear element of said second gear set, a second brake means to selectively anchor said first carrier against rotation, a first output gear meshingly engaged with the first set of pinion gearing, said first output gear drivingly mounting a second pinion gear carrier that forms the pinion gear carrier of said second gear set, said second carrier being drivingly connected to said output shaft, a second set of pinion gearing rotatably supported on said second carrier and meshingly engaged with the input gear of said second gear set, a second reaction gear rotatably mounted in said gear box and meshingly engaged with the second set of pinion gearing, and a third brake means to selectively anchor said second reaction gear against rotation.

5. A power transmission unit comprising a multi-speed planetary gear box including an input shaft, first and second planetary gear sets and an output shaft, said gear sets each being arranged in series between said input shaft and said output shafts, said input shaft mounting the input gear of said first gear set, a first reaction gear for said first gear set rotatably mounted in said gear box, a clutch device connectible between said input shaft and said first reaction gear of said first gear set, a first brake means to selectively anchor said first reaction gear of said first gear set against rotation, a first set of interengaged pinion gearing meshingly engaged with the input and first reaction gears of said first gear set, a first pinion gear carrier rotatably supporting said first set of pinion gearing, said first carrier drivingly mounting a gear forming the input gear element of said second gear set, a second brake means to selectively anchor said first carrier against rotation, a first output gear meshingly engaged with the first set of pinion gearing, said first output gear drivingly mounting a second pinion gear carrier that forms the pinion gear carrier of said second gear set, said second carrier being drivingly connected to said output shaft, a second set of pinion gearing rotatably supported on said second carrier and meshingly engaged with the input gear of said second gear set, a second reaction gear rotatably mounted in said gear box and meshingly engaged with the second set of pinion gearing, and a third brake means to selectively anchor said second reaction gear against rotation.

6. A power transmission unit comprising a hydrodynamic torque converter including impeller, turbine and reaction members, and a multi-speed planetary gear box including first and second planetary gear sets and an output shaft, said gear sets each being arranged in series between said converter and said output shaft, said gear box comprising an intermediate shaft connected to the converter turbine member and adapted to transmit drive between the turbine member and the several gear sets, said intermediate shaft mounting a first sun gear of said first gear set, a second sun gear for said first gear set rotatably mounted in said gear box, a clutch device connectible between said intermediate shaft and said second sun gear of said first gear set, a first brake means to selectively anchor said second sun gear of said first gear set against rotation, a first set of interengaged, compounded, double pinion gearing having one of the pinion gears meshingly engaged with the first sun gear of said first gear set, the other pinion gear of said first set of pinion gearing being meshingly engaged with said second sun gear of said first gear set, a first pinion gear carrier rotatably supporting said first set of pinion gearing, said first carrier drivingly mounting a gear forming the sun gear element of said second gear set, a second brake means to selectively anchor said first carrier against rotation, a first annulus gear meshingly engaged with said other pinion gear of the first set of pinion gearing, said first annulus gear drivingly mounting a second pinion gear carrier of said second gear set, said second carrier being drivingly connected to said output shaft, a second set of pinion gearing rotatably supported on said second carrier and meshingly engaged with the sun gear of said second gear set, a second annulus gear rotatably mounted in said gear box and meshingly engaged with the second set of pinion gearing, and a third brake means to selectively anchor said second annulus gear against rotation.

7. A power transmission unit comprising a multi-speed planetary gear box including an input shaft, first and second planetary gear sets and an output shaft, said gear sets each being arranged in series between said input and said output shafts, said input shaft mounting the input gear of said first gear set, a first reaction gear for said first gear set rotatably mounted in said gear box, a clutch device connectible between said input shaft and said first reaction gear of said first gear set, a first brake means to selectively anchor said first reaction gear of said first gear set against rotation, a first set of interengaged compounded, double pinion gearing having one of the pinion gears meshingly engaged with the input gear of said first gear set, the other pinion gear of said first set of pinion gearing being meshingly engaged with the first reaction gear of said first gear set, a first pinion gear carrier rotatably supporting said first set of pinion gearing, said first carrier mounting a gear forming the input gear element of said second gear set, a second brake means to selectively anchor said first carrier against rotation, a first output gear meshingly engaged with said other pinion gear of the first set of pinion gearing, said first output gear drivingly mounting a second pinion gear carrier that forms the pinion gear carrier of said second gear set, said second carrier being drivingly connected to said output shaft, a second set of pinion gearing rotatably supported on said second carrier and meshingly engaged with the input gear of said second gear set, a second reaction gear rotatably mounted in said gear box and meshingly engaged with the second set of pinion gearing, and a third brake menas to selectively anchor said second reaction gear against rotation.

8. A power transmission unit comprising a hydrodynamic torque converter including impeller, turbine and reaction members, and a multi-speed planetary gear box including a casing that supports an input shaft, first and second planetary gear sets and an output shaft, said gear sets each being arranged for connection in series between said input shaft and said output shaft, said gear box having the input shaft driving connected to the converter turbine member to transmit drive between the turbine member and the several gear sets, said input shaft drivingly mounting a first sun gear of said first gear set, a second sun gear for said first gear set journalled in said casing, a clutch device connectible between said input shaft and said second sun gear of said first gear set, a first brake means to selectively anchor said second sun gear of said first gear set against rotation, a first pinion gear carrier member for said first gear set rotatably mounted in said gear box, said first carrier member drivingly mounting a gear forming the sun gear of said second gear set, a first set of pinion gearing rotatably supported by said first carrier member and arranged in meshing engagement with the first sun gear of said first planetary gear set, a second set of pinion gearing rotatably supported on said first carrier member and meshingly engaging with said second sun gear of said first gear set, a first annulus gear drivingly connected to said output shaft and meshingly engaged with the first and second sets of pinion gearing of the first gear set, said first annulus gear proving the pinion gear carrier for said second gear set, a second break means adapted to be selectively applied to said first carrier member to anchor same against rotation, a third set of pinion gearing rotatably mounted on the carrier member of the second gear set, said third set of pinion gearing forming part of the second gear set and meshingly engaging the sun gear of the second gear set, a second annulus gear journalled on said casing and meshingly engaging said third set of pinion gearing, and a third brake means adapted to be selectivley applied to said second annulus gear to anchor same against rotation.

9. A power transmission unit comprising a hydrodynamic torque converter including impeller, turbine and reaction members, and a multi-speed planetary gear box including a casing that supports an input shaft, first and second planetary gear sets and an output shaft, said gear sets each being arranged for connection in series between said input shaft and said output shaft, said gear box having the input shaft drivingly connected to the converter turbine member to transmit drive between the turbine member and the several gear sets, said input shaft drivingly mounting a first sun gear of said first gear set, a second sun gear for said first gear set journalled in said casing, a clutch device connectible between said input shaft and said second sun gear of said first gear set, a first brake means to selectively anchor said second sun gear of said first gear set against rotation, a first pinion gear carrier member for said first gear set rotatably mounted in said gear box, said first carrier member drivingly mounting a gear forming the sun gear of said second gear set, a first set of pinion gearing rotatably supported by said first carrier member and arranged in meshing engagement with the first sun gear of said first planetary gear set, a second set of pinion gearing rotatably supported on said first carrier member and meshingly engaging with said second sun gear of said first gear set and with the first set of pinion gearing of said first gear set, a first annulus gear drivingly connected to said output shaft and meshingly engaged with the second set of pinion gearing of the first gear set, said first annulus gear providing the pinion gear carrier for said second gear set, a second brake means adapted to be selectively applied to said first carrier member to anchor same against rotation, a third set of pinion gearing rotatably mounted on the carrier member of the second gear set, said third set of pinion gearing forming part of the second gear set and meshingly engaging the sun gear of the second gear set, a second annulus gear journalled on said casing and meshingly engaging said third set of pinion gearing, and a third brake means adapted to be selectively applied to said second annulus gear to anchor same against rotation.

10. A power transmission unit comprising a multi-speed planetary gear box including an input shaft, first and second planetary gear sets and an output shaft, said input shaft mounting a first input gear of said first gear set, a first reaction gear for said first gear set rotatably mounted in said gear box, a clutch device connectible between said input shaft and said first reaction gear of said first gear set, a first brake means to selectively anchor said first reaction gear of said first gear set against rotation, a first pinion gear carrier member for said first gear set rotatably supported in said gear box, said first carrier member mounting the input gear for said second gear set, a first set of pinion gearing rotatably supported by said first carrier member and meshingly engaging with said first input gear of said first gear set, a second set of pinion gearing for the first gear set rotatably supported by the first carrier member and meshingly engaged with the first reaction gear of the first gear set and with the first set of pinion gearing of the first gear set, a first output gear for the first gear set drivingly connected to the output shaft and meshingly engaged with the second set of pinion gearing of the first gear set, said first output gear providing the pinion gear carrier of the second gear set, a second brake means adapted to be selectively applied to the first carrier member to anchor same against rotation, a third set of pinion gearing rotatably mounted on the pinion gear carrier member of the second gear set and meshingly engaging the said input gear of the second gear set, a second reaction gear rotatably mounted in said gear box and meshingly engaging said third set of pinion gearing, and a third brake means adapted to be selectively applied to said second reaction gear to anchor same against rotation.

11. A power transmission unit comprising a multi-speed planetary gear box including an input shaft, first and second planetary gear sets and an output shaft, said input shaft mounting a first sun gear of said first gear set, a second sun gear for said first gear set rotatably mounted in said gear box, a clutch device connectible between said input shaft and said second sun gear of said first gear set, a first brake means to selectively anchor said second sun gear of said first gear set against rotation, a first pinion gear carrier member for said first gear set rotatably supported in said gear box, said first carrier member mounting the sun gear for said second gear set, a first set of pinion gearing rotatably supported by said first carrier member and meshingly engaging with said first sun gear of said first gear set, a second set of pinion gearing for the first gear set rotatably supported by the first carrier member and meshingly engaged with the second sun gear of the first gear set and with the first set of pinion gearing of the first gear set, a first annulus gear for the first gear set drivingly connected to the output shaft and meshingly engaged with the second set of pinion gearing of the first gear set, said first annulus gear providing the pinion gear carrier of the second gear set, a second brake means adapted to be selectively applied to the first carrier member to anchor same against rotation, a third set of pinion gearing rotatably mounted on the pinion gear carrier member of the second gear set and meshingly engaging the said sun gear of the second gear set, a second annulus gear rotatably mounted in said gear box and meshingly engaging said third set of pinion gearing, and a third brake means adapted to be selectively applied to said second annulus gear to anchor same against rotation.

12. A power transmission unit comprising an input shaft, first and second planetary gear sets and an output shaft, said input shaft mounting a first input gear of said first gear set, a first reaction gear for said first gear set rotatably mounted in said gear box, a clutch device connectible between said input shaft and said first reaction gear of said first gear set, a first brake means to selectively anchor said first reaction gear of said first gear set against rotation, a first pinion gear carrier member for said first gear set, said first carrier member mounting the input gear for said second gear set, a first set of pinion gearing rotatably supported by said first carrier member and meshingly engaging with said first input gear of said first gear set, a second set of pinion gearing for the first gear set rotatably supported by the first carrier member and meshingly engaged with the first reaction gear of the first gear set and with the first set of pinion gearing of the first gear set, a first output gear drivingly connected to the output shaft and meshingly engaged with the second set of pinion gearing of the first gear set, said first output gear also providing the pinion gear carrier of the second gear set, a second brake means adapted to be selectively applied to the first carrier member to anchor same against rotation, a third set of pinion gearing rotatably mounted on the pinion gear carrier member of the second gear set and meshingly engaging the said input gear of the second gear set, a second reaction gear meshingly engaging said third set of pinion gearing, and a third brake means adapted to be selectively applied to said second reaction gear to anchor same against rotation.

13. A power transmission unit comprising an input shaft, an output shaft and a pair of first and second planetary gear trains arranged between said shafts, said first gear train including a pair of sun gears one of which is driven by said input shaft, compounded pinion gearing engaged with said sun gears, an annulus gear engaged with said compounded pinion gearing and connected to said output shaft, and a pair of first and second brake means adapted to be selectively applied to different gears of said first gear train to provide for the alternate transmission of a relatively fast and a relatively slow forward underdrive between said shafts, clutch means engageable between said input shaft and the other one of the sun gears of said first gear train to provide for the transmission of a forward direct drive between said shafts, said second gear train comprising engaged sun, pinion and annulus gears one of which is drivingly connected to the pinion gearing of said first gear train, another of which is drivingly connected to said output shaft and the other providing the reaction gear of the second gear set, and brake means adapted to be applied to the reaction gear of said second gear set to provide for the transmission of a reverse underdrive between said shafts.

14. A power transmission unit for an engine driven, throttle valve controlled, motor vehicle comprising a hydrodynamic torque converter including an engine driven impeller member and operatively associated turbine and reaction members, and a multi-speed planetary gear box including a casing that supports an input shaft, a first forward drive planetary gear set and a second reverse drive planetary gear set and an output shaft, said gear sets each being arranged for connection in series between said input shaft and said output shaft, said gear box having the input shaft drivingly connected to the converter turbine member and adapted to transmit drive between the turbine member and the several gear sets, a first pump means drivingly connected to said impeller member, a second pump means drivingly connected to said output shaft, a first sun gear of said first gear set drivingly connected to said input shaft that provides the drive input to each of said gear sets, a second sun gear for said first gear set journalled in said casing, a clutch device journalled on said input shaft and arranged between said converter and said gear sets, said clutch device being connectible between said input shaft and said second sun gear of said first gear set, a first brake means to selectively anchor said second sun gear of said first gear set against rotation, a first pinion gear carrier member for said first gear set rotatably mounted in said gear box, said first carrier member drivingly mounting a gear forming the sun gear of said second gear set, a first set of pinion gearing rotatably supported by said first carrier member and arranged in meshing engagement with the first sun gear of said first planetary gear set, a second set of pinion gearing rotatably supported on said first carrier member and meshingly engaging with said second sun gear of said first gear set and with said first set of pinion gearing, a first annulus gear drivingly connected to said output shaft and meshingly engaged with the second set of pinion gearing of the first gear set, said first annulus gear also providing the pinion gear carrier for said second gear set, a second brake means adapted to be selectively applied to said first carrier member to anchor same against rotation, a third set of pinion gearing rotatably mounted on the carrier member of the second gear set, said third set of pinion gearing forming part of the second gear set and meshingly engaging the sun gear of the second gear set, a second annulus gear journalled on said casing and meshingly engaging said third set of pinion gearing, a third brake means adapted to be selectively applied to said second annulus gear to anchor same against rotation, and hydraulically operated controls connected to said first and second pump means and to said several brake means and said clutch means to provide for alternate transmission of a plurality of forward underdrives, a forward direct drive and a reverse drive between said shafts, said controls including speed ratio shift valving having pressurized fluid responsive to the output shaft speed and pressurized fluid responsive to the degree of opening of the engine throttle valve applied thereto in opposed relationship such that the pressure differential therebetween controls the selective activation of the several forward drives.

15. A power transmission unit comprising a multi-speed planetary gear box including a casing that rotatably supports an input shaft, first and second planetary gear sets and an output shaft, a partition wall in said casing providing forward and aft compartments within said casing, said gear sets each being arranged in said aft compartment and adapted for connection in series between said input shaft and said output shaft, said input shaft drivingly mounting a first sun gear of said first gear set, a second sun gear for said first gear set journalled on said casing, a clutch device rotatably mounted in said forward compartment and connectible between said input shaft and said second sun gear of said first gear set, a first brake means to selectively anchor said second sun gear of said first gear set against rotation, a first pinion gear carrier member for said first gear set rotatably mounted on said partition wall, said first carrier member drivingly mounting a gear forming the sun gear of said second gear set, a first set of pinion gearing rotatably supported by said first carrier member and arranged in meshing engagement with the first sun gear of said first planetary gear set, a second set of pinion gearing rotatably supported on said first carrier member and meshingly engaging with said second sun gear of said first gear set and with said first set of pinion gearing, a first annulus gear drivingly connected to said output shaft and meshingly engaged with the second set of pinion gearing of the first gear set, said first annulus gear also providing the pinion gear carrier for said second gear set, a second brake means adapted to be selectively applied to said first carrier member to anchor same against rotation, a third set of pinion gearing rotatably mounted on the carrier member of the second gear set, said third set of pinion gearing forming part of the second gear set and meshingly engaging the sun gear of the second gear set, a second annulus gear journalled on said casing and meshingly engaging said third set of pinion gearing, and a third brake means adapted to be selectively applied to said second annulus gear to anchor same against rotation.

16. A power transmission unit comprising a hydrodynamic torque transmitter including impeller and turbine members, and a multi-speed planetary gear box including a first forward drive planetary gear set and a second reverse drive planetary gear set and an output shaft, said gear set each being arranged in series between said torque transmitter and said output shaft, said gear box comprising an intermediate shaft connected to said turbine member and adapted to transmit drive between the turbine member and the several gear sets, said intermediate shaft drivingly mounting a first sun gear of said first gear set that provides the drive input to each of said gear sets, a second sun gear for said first gear set rotatably mounted in said gear box, a clutch device connectible between said intermediate shaft and said second sun gear of said first gear set, a first brake means to selectively anchor said second sun gear of said first gear set against rotation, a first set of interengaged pinion gearing meshingly engaged between the first and second sun gears of said first gear set, a first pinion gear carrier rotatably supporting said first set of pinion gearing, said first carrier drivingly mounting a gear forming the sun gear element of said second gear set, a second brake means to selectively anchor said first carrier against rotation, a first annulus gear meshingly engaged with the first set of pinion gearing, said first annulus gear drivingly mounting a second pinion gear carrier that forms the pinion gear carrier of said second gear set, a second set of pinion gearing rotatably supported on said second carrier and meshingly engaged with the sun gear of said second gear set, a second annulus gear rotatably mounted in said gear box and meshingly engaged with the second set of pinion gearing, a third brake means to selectively anchor said second annulus gear against rotation, and means drivingly connecting said first annulus gear to said output shaft.

17. A power transmission unit comprising a hydrodynamic torque transmitter including impeller and turbine members, and a multi-speed planetary gear box including a casing rotatably supporting a first forward drive planetary gear set and a second reverse drive planetary gear set and an output shaft, said gear sets each being arranged in series between said torque transmitter and said output shaft, said gear box comprising an intermediate shaft journaled in said casing and connected to said turbine member and adapted to transmit drive between the turbine member and the several gear sets, said intermediate shaft mounting a first sun gear of said first gear set that provides the drive input to each of said gear sets, a second sun gear for said first gear set rotatably mounted in a wall of said casing, a clutch device journaled on a wall of said casing and connectible between said intermediate shaft and said second sun gear of said first gear set, a first brake means to selectively anchor said second sun gear of said first gear set against rotation, a first set of interengaged, compounded, pinion gearing meshingly engaged between the first and second sun gears of said first gear set, a first pinion gear carrier rotatably supporting said first set of pinion gearing, said first carrier drivingly mounting a gear forming the sun gear element of said second gear set, a second brake means to selectively anchor said first carrier against rotation, a first annulus gear meshingly engaged with the first set of pinion gearing, said first annulus gear drivingly mounting a second pinion gear carrier that forms the pinion gear carrier of said second gear set, a second set of pinion gearing rotatably supported on said second carrier and meshingly engaged with the sun gear of said second gear set, a second annulus gear rotatably mounted in a wall of said casing and meshingly engaged with the second set of pinion gearing, a third brake means to selectively anchor said second annulus gear against rotation, and means drivingly connecting said first annulus gear to said output shaft.

18. A power transmission unit comprising a multi-speed planetary gear box including an input shaft, a first forward drive planetary gear set and a second reverse drive planetary gear set and an output shaft, said gear set each being arranged in series between said input and said output shaft, said input shaft drivingly mounting a first sun gear of said first gear set that provides the drive input to each of said gear sets, a second sun gear for said first gear set rotatably mounted in said gear box, a clutch device connectible between said input shaft and said second sun gear of said first gear set, a first brake means to selectively anchor said second sun gear of said first gear set against rotation, a first set of interengaged pinion gearing meshingly engaged between the first and second sun gears of said first gear set, a first pinion gear carrier rotatably supporting said first set of pinion gearing, said first carrier drivingly mounting a gear forming the sun gear element of said second gear set, a second brake means to selectively anchor said first carrier against rotation, a first annulus gear meshingly engaged with the first set of pinion gearing, said first annulus gear drivingly mounting a second pinion gear carrier that forms the pinion gear carrier of said second gear set, a second set of pinion gearing rotatably supported on said second carrier and meshingly engaged with the sun gear of said second gear set, a second annulus gear rotatably mounted in said gear box and meshingly engaged with the second set of pinion gearing, a third brake means to selectively anchor said second annulus gear against rotation, and means drivingly connecting the first annulus gear to the output shaft.

References Cited in the file of this patent
UNITED STATES PATENTS

| | | |
|---|---|---|
| 2,355,427 | Duffield | Aug. 8, 1944 |
| 2,551,746 | Iavelli | May 8, 1951 |
| 2,584,965 | McFarland | Feb. 5, 1952 |
| 2,592,537 | Burtnett | Apr. 15, 1952 |
| 2,598,501 | Burtnett | May 27, 1952 |
| 2,605,652 | Kelbel | Aug. 5, 1952 |
| 2,624,215 | McRae | Jan. 6, 1953 |
| 2,629,265 | Dodge | Feb. 24, 1953 |
| 2,631,476 | Ravigneaux | Mar. 17, 1953 |
| 2,645,135 | Frank | July 14, 1953 |
| 2,699,076 | Youngren et al. | Jan. 11, 1955 |

FOREIGN PATENTS

| | | |
|---|---|---|
| 815,151 | Germany | Sept. 27, 1951 |
| 974,256 | France | Sept. 27, 1950 |